N. STATHAM.
CATALYTIC OXIDIZING OR PURIFYING MEANS.
APPLICATION FILED AUG. 15, 1913.
1,146,363.
Patented July 13, 1915.
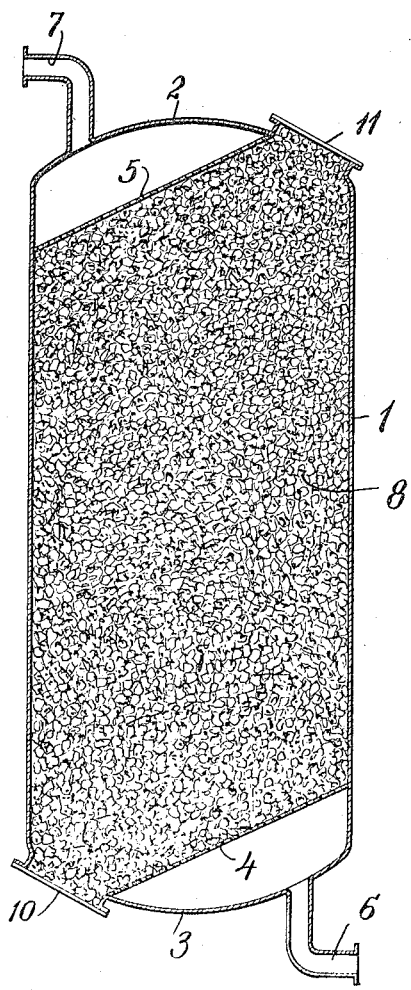

UNITED STATES PATENT OFFICE.

NOEL STATHAM, OF YONKERS, NEW YORK, ASSIGNOR TO INDUSTRIAL CHEMICAL COMPANY, OF NEW YORK, N. Y., A CORPORATION OF NEW YORK.

CATALYTIC OXIDIZING OR PURIFYING MEANS.

1,146,363.  Specification of Letters Patent.  Patented July 13, 1915.

Application filed August 15, 1913.  Serial No. 784,882.

*To all whom it may concern:*

Be it known that I, NOEL STATHAM, a subject of the King of Great Britain, and resident of Yonkers, Westchester county, New York, have made a certain new and useful Invention Relating to Catalytic Oxidizing or Purifying Means, of which the following is a specification.

This invention relates especially to means for catalytically oxidizing or purifying various materials, such as distilled spirits and other liquors by the use in a compact percolating or filtering bed or otherwise of carbonaceous catalytic material preferably in granular pieces of substantially uniform size and having not only a high percentage of voids but substantially uniform permeability in different directions because of the practically amorphous structure of the particles of carbonized vegetable or similar organic material secured by subjecting to carbonizing action organic material which has been chemically dissolved or suspended in a state of minute subdivision, this treatment apparently greatly increasing the catalytic or oxidizing action of many carbonized woody or vegetable materials.

The accompanying drawing is a somewhat diagrammatic vertical section through an illustrative form of percolator or pressure filter in which is shown a body of catalytic granular material of this character.

The oxidizing or purifying means may with advantage embody an inclosed percolator or pressure filter of the type illustrated in which the shell 1 may be made of steel or other suitable metal or material and provided with arched or otherwise shaped heads 2, 3. Internal perforated plates or diaphragms 4, 5 are preferably arranged in a somewhat diagonal position adjacent the two ends of the percolator so that the central chamber containing the bed of catalytic material communicates with suitable charging openings adjacent the ends which may be conveniently closed by cover plates 10, 11 under service conditions. The distilled spirit or other liquor to be treated may be forced through the purifying means by passing the liquor into a suitable inlet such as 6 from which it can pass through the perforated plate or diaphragm 4 and then percolate substantially uniformly through the body of granular catalytic material in the shell of the percolator, which is preferably vertically arranged, before the liquor emerges through the upper diaphragm 5 and passes out through the outlet 7. Such a percolator may of course be given any desired size and for purifying or oxidizing alcohol or distilled spirits it is usually desirable to provide a bed of catalytic material of a thickness of several feet or more through which the liquor can be forced at such speed as to secure the desired oxidizing or purifying action thereon. Granular carbonized catalytic material so formed from vegetable or other organic dissolved or suspended material as to have an amorphous highly porous structure which is practically uniformly permeable in different directions is very desirable for use in this connection and for best results the particles of catalytic material should be of substantially uniform size, pieces of one-eighth to one-half an inch or so in size being desirable for such purposes, although of course considerably smaller particles can be used in many cases. Such catalytic material may have as high a percentage of voids as eighty-five per cent. or so in some instances and because of this fact and the high permeability of the particles in different directions the material seems to possess a much more effective oxidizing or catalytic action than ordinary vegetable charcoal used for such purposes. A number of samples of such material were found to have an oxidizing capacity equivalent to twenty to thirty-five or more milligrams of oxygen per gram of the carbonaceous material. Carbonized catalytic material of this character may be conveniently produced by the dry distillation and heating or other calcination of suitably dissolved, that is chemically dissolved or suspended finely divided organic carbonaceous material, such for example, as dissolved or precipitated woody material of the character produced in connection with the manufacture of paper and so forth from wood, straw and other material by the caustic soda process, for example. This material may be dried and highly heated in a suitable kiln or chamber, such for example as a closed retort to drive off the greater portion at least of the volatile hydrocarbon and other constituents which simultaneously compacts and consolidates the material into carbonized lumps or cakes which have a correspondingly higher carbon contact. If desired these aggregated masses which are already quite porous may be subjected to a still higher heat as in a highly heated retort or kiln in which the hydrocarbons may be substantially eliminated leaving a very porous form of carbonized organic material from which any undesirable mineral matter may be readily removed as by leaching with hot water and so forth, which of course still further increases the porosity of the catalytic material. This granular carbonaceous material while so highly porous as to have as large a percentage of voids as 85% or so in some cases is at the same time free from any grain or substantial lamination so that it is practically just as porous or permeable to liquids in one direction as in another which is highly advantageous in connection with many filtering and purifying processes. Such catalytic material also seems to absorb oxygen very readily and hold it in such form as to be readily available for oxidizing organic material, such as alcohols and the like in a very effective way, possibly because of the extremely porous amorphous character of the carbonized material or the finely divided condition of its ultimate particles perhaps due to its manner of preparation from dissolved organic material.

This invention has been described in connection with a number of illustrative materials, forms, sizes, ingredients and methods of preparation and use, to the details of which disclosure the invention is not of course to be limited, since what is claimed as new and what is desired to be secured by Letters Patent is set forth in the appended claims.

I claim—

1. The catalytic oxidizing or purifying means comprising an inclosed deep percolating bed of granular carbonized material of substantially uniform sized one-eighth to one-quarter inch pieces, said carbonized material having a substantially amorphous structure rendered substantially uniformly permeable in all directions by carbonizing woody organic material which has been substantially dissolved, said carbonaceous catalytic material having as much as about eighty to eighty-five per cent. of voids and having an oxidizing capacity at least as much as about twenty to thirty-five milligrams of oxygen per gram of material.

2. The catalytic oxidizing or purifying means comprising a percolating bed of granular carbonized material of substantially uniform sized pieces, said carbonized material having a substantially amorphous non-laminated structure substantially uniformly permeable in all directions, said carbonaceous catalytic material having as much as about eighty to eighty-five per cent. of voids and having an oxidizing capacity at least as much as twenty to thirty-five milligrams of oxygen per gram of material.

3. The granular catalytic oxidizing or purifying carbonized vegetable material of substantially uniform sized one-eighth to one-quarter inch pieces, said material having a substantially amorphous structure rendered substantially uniformly permeable to liquids in different directions by carbonizing woody organic material which has been substantially dissolved, said carbonaceous catalytic material having as much as about eighty to eighty-five per cent. of voids and having an oxidizing capacity at least as much as about twenty to thirty-five milligrams of oxygen per gram of material.

4. The granular catalytic oxidizing or purifying carbonized vegetable material having a substantially amorphous structure rendered substantially uniformly permeable to liquids in different directions by carbonizing organic material which has been substantially dissolved, said carbonaceous catalytic material having as much as about eighty per cent. of voids and having an oxidizing capacity at least as much as about twenty milligrams of oxygen per gram of material.

5. The carbonized vegetable catalytic oxidizing or purifying material consisting substantially of carbon free from substantial proportions of hydrocarbons and having a highly porous substantially amorphous non-laminated structure substantially uniformly permeable to liquids in different directions and having an oxidizing capacity of about twenty to thirty-five milligrams of oxygen per gram of material.

6. The granular catalytic oxidizing or purifying carbonized vegetable material consisting substantially of carbon free from substantial proportions of hydrocarbons and having a substantially amorphous non-laminated structure substantially uniformly permeable to liquids in different directions, said carbonaceous catalytic material having as much as about eighty per cent. of voids and having an oxidizing capacity at least as much as about ten milligrams of oxygen per gram of material.

7. The granular catalytic oxidizing or purifying carbonized vegetable material consisting substantially of carbon free from substantial proportions of hydrocarbons and having a substantially amorphous structure rendered substantially uniformly permeable to liquids in different directions by carbonizing organic material which has been substantially dissolved, said carbonaceous catalytic material having as much as about eighty per cent. of voids and having an oxidizing capacity at least as much as about twenty milligrams of oxygen per gram of material.

8. The catalytic oxidizing or purifying means comprising a percolating bed of granular carbonized vegetable material consisting substantially of carbon free from substantial proportions of hydrocarbons and having a highly porous substantially amorphous non-laminated structure substantially uniformly permeable in different directions, said carbonaceous catalytic material having an oxidizing capacity at least as much as about fifteen to thirty-five milligrams of oxygen per gram of material.

NOEL STATHAM.

Witnesses:
HARRY L. DUNCAN,
JESSIE B. KAY.